United States Patent [19]
Lundberg

[11] 3,867,319
[45] Feb. 18, 1975

[54] PROCESS OF MAKING A FOAMED IONIC POLYMER

[75] Inventor: Robert D. Lundberg, Somerville, N.J.

[73] Assignee: Exxon Research and Engineering Company, Linden, N.J.

[22] Filed: Mar. 29, 1973

[21] Appl. No.: 346,093

[52] U.S. Cl....... 260/2.5 R, 260/2.5 H, 260/2.5 HA, 260/2.5 HB, 260/30.6 R, 260/30.8 R, 260/31.8 AN, 260/31.8 G, 260/31.8 H, 260/32.6 R, 260/32.6 N, 260/32.6 PQ, 260/33.4 R, 260/33.4 PQ, 260/33.6 UA, 260/33.6 PQ, 260/33.8 UA, 260/33.8 F

[51] Int. Cl............................ C08f 47/10, C08j 1/28

[58] Field of Search ..... 260/2.5 H, 2.5 HA, 2.5 HB, 260/2.5 R

[56] References Cited
UNITED STATES PATENTS

| 2,764,563 | 9/1956 | McMaster et al. | 260/79.3 R |
|---|---|---|---|
| 2,764,576 | 9/1956 | Blaser | 260/79.3 R |
| 2,928,130 | 3/1960 | Gray | 260/2.5 E |
| 3,098,832 | 7/1963 | Pooley et al. | 260/2.5 E |
| 3,322,734 | 5/1967 | Rees | 260/79.3 MU |
| 3,452,123 | 6/1969 | Beckmann et al. | 260/2.5 HA |
| 3,522,222 | 7/1970 | Taylor | 260/80.78 |
| 3,522,223 | 7/1970 | Taylor | 260/93.7 |
| 3,577,357 | 5/1971 | Winkler | 260/2.5 HB |
| 3,663,466 | 5/1972 | Jablonski | 260/2.5 HB |
| 3,676,378 | 7/1972 | Heil et al. | 260/2.5 HB |

*Primary Examiner*—Morton Foelak
*Attorney, Agent, or Firm*—Robert J. Baran

[57] ABSTRACT

This invention relates to a process for preparing novel foamed polymeric products which comprises foaming an ionic polymer in the presence of a volatile polar compound which acts as a plasticizer for the ionic groups present in said ionic polymer. Preferably the ionic polymer comprises from about 0.2 to 20 mole percent ionic groups, especially sulfonate groups. In the most preferred embodiment of the instant invention, a sulfonated polystyrene polymer, admixed with a foaming agent, and a volatile polar compound, e.g., methanol, is heated to a temperature at which foaming occurs. Upon cooling, a high strength, low density foam is formed which can be reprocessed by admixing with a low boiling solvent for polystyrene and methanol, and repeating the above foaming process.

28 Claims, No Drawings

PROCESS OF MAKING A FOAMED IONIC POLYMER

BACKGROUND OF THE INVENTION

1. Field of the Invention

This invention relates to a process for preparing novel foamed polymeric products which comprises foaming an ionic polymer in the presence of a volatile polar compound which acts as a plasticizer for the ionic groups present in said ionic polymer. Preferably the ionic polymer comprises from about 0.2 to 20 mole percent pendant ionic groups, especially sulfonate groups. In the most preferred embodiment of the instant invention, a sulfonated polystyrene polymer, admixed with a foaming agent, and a volatile polar compound, e.g., methanol, is heated to a temperature at which foaming occurs. Upon cooling, a high strength, low density foam is formed which can be reprocessed by admixing with a low boiling solvent for polystyrene and methanol, and repeating the above foaming process.

2. Description of the Prior Art

Foamed plastics have represented one of the fastest growing markets in the polymer industry in the past 15 years. This growth is expected to continue, and it is claimed that the potential usage of foamed plastics could far exceed the ability of the plastics industry to supply the needed materials.

There are essentially only two major flexible foam products now available in any large volume. They are polyurethane foam and plasticized poly (vinylchloride) foam. At this time, semiflexible foamed polyolefins are being commercialized for special applications; however, these do not represent large volume products.

Flexible polyurethane foams are normally prepared by the reaction of a diisocyanate, a hydroxyl terminated polyol, water, surfactant, catalysts, and possibly an external blowing agent. When these are intimately blended, a number of reactions occur very rapidly. In a matter of seconds a polymer is formed, expanded and cross-linked. The timing of polymerization and expansion is critical and is controlled by the catalysts, surfactants, and relative concentration of the diisocyanate and water.

The various chemical reactions which can occur are exceedingly complex and have been the subject of numerous publications and thirty years of intensive research. Furthermore, the diisocyanates employed in such studies are expensive and quite toxic, such that they can provide severe hazards to the personnel performing these reactions. It is also evident that after achieving a cured polyurethane foam, the process is irreversible. Therefore, if the resulting product does not meet specifications, it is of little or no value.

These problems are cited to demonstrate that despite almost overwhelming problems and major expense, these polyurethane systems have grown to their present volume due to product performance and market need.

A second flexible foam system which has achieved commercial success is that of foamed polyvinylchloride (PVC), suitably pasticized to yield a flexible cellular product. These materials are higher density (12 to 20 lbs./cu. ft.) than polyurethanes (as low as 1–2 lbs./cu.ft.). Vinyl foam is expanded by the use of chemical blowing agents near the melting point of PVC. These expand to generate the cellular structure. Deficiencies of PVC foamed systems are the difficulties of achieving low foam densities, lack of strength of the foams at high temperature (since they are not chemically cross-linked, these systems can collapse without close control of foaming temperature) and restriction of the foaming concept to a single base polymer, that of PVC.

U.S. Pat. No. 3,322,734 teaches that ionic polymers, for example, partially sulfonated polystyrene and partially carboxylated polystyrene, can be employed as plastics for molding objects and utilized to prepare foams. The present invention differs from that patent on a number of very important points. U.S. Pat. No. 3,322,734 teaches that the presence of a modest amount of carboxyl or sulfonic acid groups, if neutralized to a critical degree, permits processability by conventional plastic processes at elevated temperatures, and yet retains ionic associations at ambient temperature. The neutralization process simply involves reaction of the acid moiety with a suitable metal salt, metal oxide, metal hydroxide, etc. to a suitable extent. That art teaches that the acid form should not be completely neutralized —preferably the neutralization should be only 80 percent complete (i.e., the metal hydroxide or other compound should be added in an amount corresponding to 80 percent of the stoichiometric amount of acid present), and in no case should exceed 90 percent of the stoichiometric equivalence. (Similarly that patent teaches a minimum fraction of the acid groups must be neutralized, i.e., 10 percent). Thus it is emphasized clearly in the prior art that incomplete neutralization of the acid moiety is essential in order that the resulting products be fabricable.

Thus, those products are conventional plastic systems in that they respond to elevated temperatures and shear such that the ionic associations are diminished or virtually eliminated. Consequently flow occurs and the products can be molded or foamed much like conventional thermoplastics, such as polystyrene or polyethylene. Similarly, if one creates a foam from these ionic polymers, and exposes it to elevated temperatures (for example, 100° to 150°C.) the ionic interactions are diminished and flow occurs—that is, the foam collapses. The dimensional stability of such materials at elevated temperatures is inherently poor.

The present invention differs from the ionic polymer foams disclosed in the prior art in the following critical areas:

a. The products of the present invention are preferably neutralized completely.

b. The neutralized compositions of this invention are not readily processed by plastics processing equipment even at very high temperatures because, in the absence of a suitable additive, the ionic groups are very strongly associated.

c. The products, as described here, due to their strong associations, behave as crosslinked polymers at very high temperatures, manifesting unusual and valuable dimensional stability.

d. These associations of these ionic polymers are broken up by the addition of suitable agents which disrupt the ionic domains, permits the foaming process, and then removes itself from the vicinity of the ionic groups.

e. In the absence of these suitable plasticizing agents these products are not foamed into desirable products under practical conditions because the strong ionic associations preclude formation of a stable, desirable cell structure.

It is evident from this earlier discussion that chemically cross-linked foams possess certain advantages, especially resistance to flow at elevated temperatures. However, such advantages are achieved at a substantial cost in complexity of chemical reactions, in processing problems, inability to reuse scrap, inability to refoam defective parts, etc.

On the other hand, conventional thermoplastic foams, such as polystyrene foams, polyvinyl chloride foams, ionic polymers foams of the prior art etc. possess the virtues of easy processability, reuse of scrap, and simplicity of the foaming operation. Yet these systems all possess the failing of poor dimensional stability at elevated temperature. It is evident that for both classes of systems, chemically cross-linked foams and thermoplastic foams, each possess virtues and deficiencies which are inherent in their mode of preparation.

The present invention provides nearly all of the advantages of thermoplastic foams, and yet retains in the foamed part nearly all of the virtues of the chemically cross-linked foam.

SUMMARY OF THE INVENTION

It has now been unexpectedly discovered that novel foamed polymeric products may be prepared by foaming a mixture comprising an ionic polymer and a volatile polar compound which acts as a plasticizer for ionic groups present in said ionic polymer. In more detail, a mixture comprising an ionic polymer, said ionic polymer comprising from about 0.2 to about 20 mole per cent pendant ionic groups, a foaming agent, and a volatile polar compound is heated to a temperature at which foaming occurs, cooled, and the novel foamed products of the instant invention, recovered.

The polar compound is further characterized as being a preferential plasticizer for said pendant ionic groups that is, it will have substantially no effect on the nonionic portion of the polymer and having a boiling point that is not more than 100°C. above the foaming temperature, preferably not more than 50°C., and most preferably not more than 25°C. above the foaming temperature. If the volatile polar compound possesses a boiling point substantially above this value, it may not be sufficiently volatile, and foam collapse may occur. Furthermore, the boiling point of the volatile polar compound should not be too far below the foaming temperature, otherwise it will volatilize too quickly, giving either a dense foam on one whose cell structure is not optimizied. Generally, it is possible to formulate around this latter problem by increasing the amount of the volatile polar compound, or by altering the length of time the composition is held at said foaming temperature. For most foaming operations, it is preferred that the boiling point of the polar compound be not greater than 100°C. below the foaming temperature (i.e. if the foaming temperature is 200°C., the boiling point of the polar compound should be at least 100°C.). It is possible under certain conditions, e.g. very rapid foaming processes to employ a more volatile polar compound, however, the process becomes more critical with respect to temperature and amount of additives than would be desirable. The time interval for the foaming process can be variable ranging from a time of 5 to 15 minutes. The amount of the volatile polar compound which is employed will depend on its boiling point, the degree of polarity and the amount of ionic groups contained within the polymer. Thus, the amount of volatile polar compound employed should be enough to disrupt the ionic domains of the polymer but not so much that its removal will present substantial problems. Generally the amounnt will normally be in the range of from about 0.1 to about 50, preferably from about 0.2 to 20 moles plasticizer per moles of ionic groups. This process is useful for forming foamed polymeric products in any of the forms known in the prior art and, unlike the prior art foaming processes leading to cross-linked foams, allows the reuse of scrap foamed polymers; that is, the foamed polymers of the instant invention may be reprocessed.

The reprocessing of the scrap foamed polymers may be accomplished in several ways—for example, by dissolving the polymer in a solvent mixture comprised of a solvent for the polymer backbone and a polar compound (such as an alcohol) for the ionic domains. This solution may be precipitated to yield the bulk polymer, which can then be formulated with proper foaming agents and volatile polar compound. Alternatively the scrap foamed polymer can be combined with a suitable volatile polar compound and then processed using thermoplastic techniques and subsequently combined with additional unprocessed polymer. The resulting blends can be formulated with foaming agent and additional polar compounds, and subsequently refoamed.

This advantage of reprocessing scrap foamed polymer results from the fact that the foamed products of the instant invention have physical crosslinks and not the chemical crosslinks known in the prior art. Physical crosslinks result from the interactions of the pendant ionic groups. The polar compound disrupts these interactions, thus the foam behaves as any uncrosslinked foam; for example, it can be readily dissolved in appropriate solvents. After foaming, the polar compound, because of its volatility, is removed from the foamed products leaving behind the strong and temperature resistant physical crosslinks.

This process is admirably suited to the preparation of foamed sheet (for example, in extrusion), foamed pellets and foamed molded samples. Furthermore, due to the excellent dimensional stability of the foamed plastic products, these can be heated subsequent to the foaming process and stamped or forged into complex foamed articles simply by a stamping and cooling cycle. The cooling of the plastic foamed article below its softening temperature permits the retention of complex configurations. Similarly this process permits the preparation of foamed articles which have a foamed surface of relatively high density, and an interior core of substantially lower density. Such foamed articles possess relatively high strength to weight ratios.

The instant invention is related to U.S. Ser. No. 199,799, filed Nov. 17, 1971, in the names of R. D. Lundberg and H. S. Makowski, but differs therefrom, in that the instant invention relates to a novel ionomer foam, and the process for making said foam, while U.S. Ser. No. 199,799 discloses and claims a process for fabricating articles from said ionomer, which comprises a. adding a sufficient volatile preferential plasticizer to said ionomer, said plasticizer having a boiling point substantially above the softening point of the ionomer backbone;

b. heating said ionomer to a temperature between the softening point of the backbone and the boiling point of the plasticizer;

c. forming said ionomer in a first desired shape at the temperature specified in step (b);

d. evolving said volatile plasticizer;

e. re-forming the product of step (d) in a second desired shape; at a temperature above the softening point of the backbone but below the ultimate softening point; and f. cooling below the softening point of the backbone.

The foaming agents which may be used in the process of the instant invention are well known in the art and include compounds that decompose at the temperature of foaming to liberate gases, and the low boiling liquids which are converted into gaseous form by heating.

Examples of foaming agents which decompose at specific temperatures to liberate gases include the following representative compounds for which the approximate temperature range of decomposition is indicated in parenthesis: sodium bicarbonate (160°–200°C.), sodium bicarbonate and citric acid combination (0°C to 200°C.), azobis formamide (160°–200°C.), azobisisobutyronitrile (90°–115°C.), diazoaminobenzene (90°–110° C.), N,N'dimethyl-N,N'-dinitroso-terephthalamide (90°–105°C.), N,N'-dinitrosopentamethylenetetramine (130°–190°C.), toluene-4-sulfonyl hydrazide (100°–110°C.), 4,4'-oxybis (benzene sulfonyl hydrazide) (120°–140°C.), and similar compounds known in the art. (For example, see reference "Plastic Foams"; Vol. II, by C. J. Bennings, Wiley Interscience Publishers, 1969, Appendix A-II). Generally, from about 0.02 to 20 weight percent, preferably from 1 to 5 weight percent, based on ionic polymer of said foaming agents, will be used in the process of the instant invention.

The low boiling liquids which can be utilized are those which boil at a suitably low temperature to allow for convenient foaming. For example, these liquids must volatilize at a temperature where the polymer flows. When preparing a plastic foam, the boiling point of the liquids can be extremely low, even below room temperature, because if they are suitably dispersed in a solid plastic polymer they will not readily vaporize until the polymer reaches a temperature at which it flows. Examples of such suitable liquids are pentane, hexane, heptane, benzene, toluene, methylene chloride, trichloroethane, 1,2-dichloroethane and the like. Similarly materials, which are gases at room temperature, may be employed include carbon dioxide, ammonia, dichlorodifluoromethane, sulfur dioxide, nitrogen and the like. Preferably the low boiling liquids are either solvents or partially soluble in the nonionic polymer phase. For example, when a partially sulfonated polystyrene polymer is utilized in the instant invention, the foaming agent is preferably a liquid with some solubility in polystyrene. Preferably the low boiling liquid will have a boiling point of less than 200°C., more preferably less than 150°C.

Sufficient liquid or solvent must be used to provide a foam of the proper density. Under some circumstances this solvent will actually dissolve the polymer and in these cases, there will be a large excess of the solvent. In other cases where the low boiling liquid is only sparingly soluble in the polymer, only modest amounts are required. In general, the amount of low boiling liquid (foaming agent) will range from about 1 to about 300 weight percent, based on the ionic polymer, more preferably from about 2 to about 50 weight percent, and most preferably from about 3 to about 25 weight percent.

Ionic polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, copolymers of any of the above, sulfonated polyisobutylene, sulfonated ethylene-propylene terpolymers, sulfonated polyisoprene, and sulfonated elastomers and their copolymers. The ionic polymers of the invention also include plasticized compositions of the above; for example, a plastic ionic polymer, which when foamed according to the process of the instant invention will give a rigid foam, may be suitably plasticized prior to foaming to give a flexible foam.

The ionic polymers of the instant invention preferably comprise from about 0.2 to 20 mole percent pendant ionic groups. More preferably, ionic polymers comprise from about 0.5 to 10 mole percent pendant ionic groups. These pendant ionic groups include carboxyl groups, carboxylate groups, sulfonate groups and phosphonate groups; most preferred are sulfonate groups. In accordance with the above the most preferred ionic polymers for utilization in the instant invention to prepare rigid plastic foams comprise partially sulfonated polystyrene and polystyrene derivatives, i.e. t-butyl styrene and other alkyl styrenes comprising from 9 to 20 carbon atoms. Ionic polymers derived from elastomeric polymers such as sulfonated polyisobutylene copolymer, and sulfonated ethylene-propylene-ethylidene norbornene and ethylene-propylene-1,5-hexadiene terpolymers are preferred ionic polymers for utilization in the instant invention for the preparation of flexible foams.

The ionic groups present in the ionic polymers of the instant invention are derived from substantially completely neutralized acid or other moieties. For example, if a sulfonic acid derivative is employed as the intermediate, sufficient metal hydroxide is added to neutralize at least 90 percent of the acid groups. Even that residual 10 percent of unneutralized acid groups can have a deleterious influence on the strength of the physical crosslinks derived from the ionic association. For that reason it is preferred that greater than 98 percent of the acidic intermediate species be neutralized, and it is most preferred that essentially all of the pendant ionic groups be neutralized. It is also possible to add sufficient basic metal hydroxide or oxide to over neutralize without any specific benefit other than to insure complete neutralization. From a practical viewpoint, it is preferred that this excess of base be kept to no more than 50 mole percent beyond the stoichiometric equivalence of the pendant ionic groups. The neutralizing agents are selected from the group consisting of ammonia, primary, secondary and tertiary amines having up to 30 carbons; basic compounds selected from Groups I and II of the Periodic Table of the Elements, e.g. sodium hydroxide, potassium hydroxide, calcium hydroxide, and magnesium hydroxide and basic lead, tin and antimony compounds.

Preferably the neutralizing agent is selected from the group consisting of basic metal compounds wherein the metal is selected from Groups I and II of the Periodic Table of the Elements. Ammonia and amine neutralizing agents are not in the preferred class, because they yield lower strength foams as compared to the corresponding foams, which are prepared by neutralization with basic Groups I or II metal compounds. When, in fact, ammonia or amines are utilized as neutralizing agents, the degree of neutralization should be greater than 98 percent, preferably 100 percent. The basic lead, tin and antimony compounds are not in the preferred class of neutralizing agents because they yield foams which are difficult to fabricate. Preferably the basic metal compounds selected from Groups I and II of the Periodic Table, and the basic lead, tin and antimony compounds, are hydroxides, oxides, carboxylates, or $C_1$ to $C_{20}$ alkoxides. The most preferred neutralizing agents are selected from the group consisting of the hydroxides, oxides, carboxylates and $C_1$ to $C_{20}$ alkoxides of calcium, barium, magnesium, sodium and potassium.

The choice of the polar compound, within the scope of the parameters disclosed above is also illimitable. Preferably, the polar compound boils from 100°C. below to about 50°C. higher than the temperature at which foaming takes place.

The polar compound or substance can be defined as having a dipole moment of greater than 0.9 debyes. Preferably the polar compound should have a dipole moment from 1.2 to 5.5 debyes and a boiling point less than 200°C. Finally, the most preferred polar compounds are those having a dipole moment from 1.2 to 5.5 debyes and a boiling point less than 150°C. It is also possible to utilize a polar compound simultaneously as the blowing agent and as the plasticizer for the pendant ionic groups. While this is effective in generating foams, we have observed that the foams having the best cell structure and most convenient process are achieved by selecting the foaming agent and the polar compound independently to provide the most suitable system for a given set of foaming conditions.

When a low boiling solvent is utilized as the foaming agent, (compounds within the scope of this definition may be determined by any table which would give boiling points of such solvents) preferably the polar compound is chosen so as to be substantially immiscible with the low boiling solvent and thus the boiling points of the two are independent of each other.

While examples of suitable polar compounds fitting the constraints described will be listed below, it is important to note that the function of the polar compound is to relax the ionic associations prior to, and during, the foaming operation. Thus, the suitability of a polar compound to effect this relaxation can be determined experimentally in a number of ways. The most direct approach is to mix the polar compound with the ionic polymer and examine the melt viscosity of the mixture at an elevated temperature near that where it is desired to foam the polymer. If the melt viscosity of the mixture of polar compound and ionic polymer is lowered at least 5-fold from that of the ionic polymer alone at that same temperature, then it is apparent that the polar compound has effectively relaxed the ionic associations at that elevated temperature. We observe that even small amounts of alcohols (1 to 10 weight percent) can readily lower the melt viscosity of these ionic polymers by 10 to 100 fold or more at elevated temperatures, and for this reason alcohols are a highly preferred embodiment of the polar compound.

In general, alcohols having up to 20 carbon atoms and boiling at a temperature of from about 60° to 200°C. are the preferred polar compounds for use in the process of the instant invention. Specific alcohols within the scope of the invention include methanol, ethanol, propanol, n-butanol, sec-butanol, isobutanol, isopropanol, pentanol, hexanol, heptanol, decanol, benzyl alcohol, octanol, 2-ethyl hexanol, etc. Water may also be used in a similar manner. Other polar compounds which can be utilized include ammonia and $C_1$ to $C_{20}$ amines, such as ethylamine, methylamine, dimethylamine, triethylamine, $C_1$ to $C_{20}$ thiols such as methanethiol, ethanethiol, propanethiol, etc. As disclosed above, the ionic polymers of the instant invention include polymers in which the non-polar phase is plasticized by a non-volatile solvent for that phase. For example, the use of a plasticizer for the polystyrene phase of a homopolymer of polystyrene sodium sulfonate containing 5 mole percent pendant sodium sulfonate groups may be determined as follows:

One gram of polystyrene is dispersed in 100 ml of a non-volatile solvent, such as dibutyl phthalate. The mixture is heated to about 80°C. to expedite the dissolution process for 4 hours, and cooled. If a true solution results, then that non-volatile solvent is an excellent plasticizer for the polystyrene phase. This type plasticizer will be referred to as chain plasticizer since it preferentially solvates the polymer chain backbone and has little or no effect on the ionic domains. It is necessary that the plasticizer have little effect on the domains, since unlike the volatile polar compound, it will not be removed during the foaming operation and thus the benefits of having associated ionic groups in the fabricated foam will not inhere. The purpose of these type plasticizers is to convert those polymers which would normally result in rigid foams into foams which are flexible and semi-elastomeric. The use of such chain plasticizers is limited to compounds which solvate the polymer chain and which have a boiling point of at least 150°C. and preferably 200°C. The chain plasticizer should also have a boiling point in excess of the temperature of the foaming process so that it will not be lost during the foaming, nor should it boil at or near any temperature at which the foamed products will be used. Specific chain plasticizers which can be used with the preferred sulfonated polystyrene polymers include di-n-hexyl adipate, dicapryl adipate, di-(2-ethyl hexyl) adipate, dibutoxy-ethyl adipate, benzyl-octyl adipate, tricyclohexyl citrate, butyl phthalyl butyl glycolate, butyl laurate, n-propyl oleate, n-butyl palmitate, dibutyl phthalate, dihexylphthalate, dioctylphthalate, tributyl phosphate, dioctyl sebacate and mixtures thereof.

The process of the instant invention provides novel foamed products. The novel foam products may have a density varying from 1 lb. per cubic foot to 50 lbs. per cubic foot, preferably from 1.5 lbs. per cubic foot to 35 lbs. per cubic foot, and include both rigid and elastomeric foams. These foams are novel in that they may be reprocessed unlike the crosslinked foams known in the prior art. Reprocessing may be easily carried out by dissolving the foamed polymer in a suitable solvent; that is, a mixture of a low boiling foaming agent and volatile polar compound which will plasticize the pendant ionic groups. This solvent combination may be the same one utilized in forming the original product or may be different. The only requirement is the volatile polar compound which is used as a portion of the solvent mixture for dissolving fabricated foam must be a plasticizer for the pendant ionic groups.

Very often in the preparation of commercial foam samples, nucleating agents are employed as additives to create a very uniform and small cell structure. These nucleating agents are well known to those versed in the art. Systems such as sodium bicarbonate and citric acid or calcium silicate are often employed. These additives can also be utilized in the foam produced in this invention.

The preferred ionic copolymers for use in the instant invention i.e. sulfonated polystyrene and substituted derivatives thereof, may be prepared by the following procedures:

I. Copolymerization with Sulfonate Containing Monomers

For example, alkali metal salts of styrene sulfonic acid can be copolymerized using free radical initiators with a variety of thermoplastic forming monomers such as styrene, t-butyl styrene, chlorostyrene, and the like.

II. Direct Sulfonation of Homopolymers

Sulfonic acid groups can be introduced into aromatic homopolymers such as polystyrene, polyvinyl toluene, poly-alpha-methylstyrene, poly-t-butyl styrene, and the like by direct reaction with a sulfonating agent. Sulfonating agents such as sulfuric acid and chlorosulfonic acid can be used. Preferred sulfonating agents are acetyl sulfate, i.e., the mixed anhydride of acetic acid and sulfuric acid ($CH_3COOSO_3H$), and sulfur trioxide complexes with dioxane, tetrahydrofuran, and trialkyl phosphates. Of the trialkyl phosphate complexes, those consisting of trialkyl phosphate/$SO_3$ ratios of about 1.0 are most preferred. The resulting polymer now contains sulfonic acid groups which can be neutralized directly with metal oxide, metal hydroxide, or metal salts to achieve the desired metal sulfonate containing polymer. Alternatively, the sulfonic acid containing polymer can be isolated by precipitation and neutralized either in bulk or by redissolving the polymer.

III. Direct Sulfonation of Modified Polymers

Where desirable homopolymers cannot be directly reacted to produce sulfonate containing materials it is possible to introduce copolymerization functional groups capable of reacting with sulfonating agents. The two most desirable functional groups for this purpose are double bonds and aromatic groups, especially phenyl groups; See U.S. Pat. No. 3,642,728 incorporated herein by reference for methods of sulfonating polymers containing olefinic unsaturation. Again the polymers are neutralized as described above.

A. Copolymers of Aromatic Monomers

Copolymerization of vinyl monomers and relatively small amounts of styrene or other vinyl aromatics reactive to sulfonating agents produces copolymers with essentially homopolymeric properties capable of being sulfonated. Illustrative examples of such copolymers are chlorostyrene-styrene, styrene-acrylonitrile, styrene-vinyl acetate, etc. In non-vinylic polymer systems an aromatic group can be introduced into the polymer through the use of an aromatic containing monomer, e.g., phenyl glycidyl ether copolymerized with propylene oxide. The reagents sitable for introducing sulfonic acid groups directly are the same as those described for the direct sulfonation of homopolymers (II). The polymers are neutralized as described above.

B. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the incorporation of unsaturation in vinyl polymers are conjugated diolefins, such as butadiene, isoprene, dimethyl butadiene, piperylene and non-conjugated diolefins, such as allyl styrene. Copolymers can be made by using any of the applicable initiating systems, i.e., free radical, cationic, anionic, or coordinated anionic. In polyethers unsaturation can be introduced by copolymerization with unsaturated epoxides, e.g., allyl glycidyl ether.

The reagents which are suitable for the direct introduction of sulfonic acid groups into unsaturated thermoplastics are the complexes of $SO_3$ with reagents such as dioxane, tetrahydrofuran, trialkyl phosphates, carboxylic acids, trialkylamines, pyridine, etc. Especially suitable are the trialkyl phosphate complexes, and the most preferred are the 1/1 complexes of $SO_3$/triethyl phosphate. The polymers are neutralized as described above.

IV. Oxidation of Sulfur Containing Functional Groups

Polymers which contain sulfinic acid groups can be readily air oxidized to sulfonic acids. Polymers containing mercaptan groups can be easily converted to the sulfonic acid groups through oxidation of the mercaptan groups with a variety of oxidizing agents, such as hydrogen peroxide, potassium permanganate, sodium dichromate, etc.

Ionic polymers of the instant invention would generally have a weight average molecular weight greater than 5,000, more preferably the molecular weight will range from 10,000 to 500,000, most preferably from 20,000 to 250,000.

In general, the process of the instant invention comprises mixing an ionic polymer, which comprises from about 0.2 to 20 moles percent pendant ionic groups, with a volatile polar compound which is a selective plasticizer for said ionic groups, and a foaming agent, heating to a temperature at which the foaming agent is converted into a gaseous form, and cooled to recover the novel foamed products of the instant invention. The ionic groups described above are neutralized to a degree of at least 90 percent, preferably 98 percent, and more preferably 100 percent. The above mixture will comprise from 20 to 99 weight percent of the ionic polymer, from 0.1 to 50 moles of volatile polar solvent per mole of pendant ionic group. If a low boiling liquid is utilized as the foaming agent, its weight may range from 1 to 300 percent by weight of said ionic polymer. When a foaming agent that decomposes to liberate gas is utilized, its weight may range from 0.02 to 20 percent by weight of said ionic polymer. The ionic polymer, volatile polar compound and foaming agent may be mixed in any order, preferably volatile polar compound is admixed with the ionic polymer and then the ionic foaming agent blended therein.

The mixture is generally heated to a temperature of at least 60°C., preferably greater than 100°C. to initiate foaming. Heating the mixture may be carried out by processes known in the art. for example in a forced air oven, or in conventional polymer fabrication equipment such as a heated extruder. The foaming may be carried out for from about 5 seconds to 15 minutes, preferably from about 30 seconds to 5 minutes. After the foaming agent is substantially completely converted to the gaseous form, and the volatile polar compound is substantially completely removed from the vicinity of the ionic groups, the foamed product is cooled below its softening temperature, e.g. to room temperature, for subsequent use.

The novel foamed products of the instant invention may be reprocessed by dissolving in a mixture of a solvent for the non-ionic (backbone) portion of the ionic polymer, and a volatile polar compound which is a selective plasticizer for the pendant ionic groups present in said ionic polymer. The solvent may be removed by heating nad the ionic polymer reformulated with a foaming agent and the above foaming process repeated.

The following are specific embodiments of the instant invention. There is no intention to be limited to the disclosure which said specific embodiments represent.

EXAMPLE 1

Preparation of a Rigid Foam

One part of a sulfonated plastic (a lightly sulfonated polystyrene wherein sodium sulfonate groups were attached to 1.8 mole percent of the styrene units) was blended intimately with 1 part of a solvent mixture (80 percent by weight of benzene and 20 percent by weight of methanol). Also 0.01 parts of finely divided MgO was added as a nucleating agent. The mixture was mixed thoroughly to yield a viscous but fairly homogeneous mass, and was placed in a metal container. The container was placed in a forced air oven at 125°C. Within 15 minutes, a foamed product of excellent cell structure resulted which remained intact. The product was permitted to remain at 125°C. for ½ hour and then removed, and cooled to room temperature. The cell structure was maintained.

EXAMPLE 2

Foaming of Polystyrene Control

An attempt to repeat Example 1 however, substituting finely divided high molecular weight polystyrene homopolymer resulted in a collapse of the foam structure to yield an unfoamed film with a few large bubbles dispersed in it.

EXAMPLES 3, 4, 5 and 6

A series of experiments designed to test the influence of volatile solvent and amount of domain plasticizer was attempted as follows:

neous mass. The products were then placed in an oven at 125°C. for 30 minutes, removed and cooled. In Example 6, the foam density was measured by displacement of water and found to be 0.532 g/cc or 33.3 lbs./cu. ft. These experiments demonstrate that tough flexible foams of good cell structure can be achieved by this approach. Examples 3 and 4 demonstrate that the amount of polar cosolvent can markedly influence the cell structure of the foam. It is preferable to use a minor amount of the polar cosolvent since if too much is present, the foam may partially collapse because the polar cosolvent has not completely volatilized at the time when the blowing agent has achieved a minimum foam density.

Examples 5 and 6 compare blowing agents of different volatility. At the particular time and temperature employed (125°C.) it is evident that the use of a less volatile blowing agent (toluene) resulted in a better cell structure than with the more volatile one (benzene).

EXAMPLE 7

This example demonstrates the reuse of a rigid plastic foam of this invention. One part of the rigid foamed product of Example 1 is blended with 1 part of a solvent mixture (80 percent by weight of benzene and 20 percent by weight of methanol). The mixture becomes semi-fluid and the foamed structure readily collapses. The mixture becomes viscous but homogeneous and is placed in a metal container and then in a forced air oven maintained at a temperature of 125°C. Within 15 minutes, a foamed product of excellent cell structure is achieved which does not collapse after an additional ½ hour exposure at 125°C. The product is then removed and cooled to room temperature. The cell structure is maintained and appears comparable to that of the original foamed sample of Example 1. This same process can be repeated several times.

EXAMPLE 8

A further refinement of this invention pertains to a process for making an instant rigid or flexible foam without the heating process normally employed. For example, the use of a sulfonated plastic or elastomer (such as sulfonated polystyrene or sulfonated butyl rubber — in all cases these sulfonate systems are employed as metal or amine salts) in the presence of a solvent or mixture of solvents boiling below room temperature containing a small amount of a polar plasticizer which also boils below room temperature, permits the preparation of a viscous polymer solution under pressure (less than 1,000 psi and preferable about 50 psi).

|  | Example 3 | Example 4 | Example 5 | Example 6 |
| --- | --- | --- | --- | --- |
| Parts Sulfonated Polymer | 0.5 | 0.5 | 0.5 | 0.5 |
| Parts Dioctyl Phthalate-Plasticizer | 1.0 | 1.0 | 1.0 | 1.0 |
| Parts Methanol | 0.2 | 0.2 | 0.05 | 0.05 |
| Parts MgO | .01 | .01 | .01 | .01 |
| Parts Benzene | 1.0 | — | 1.0 | — |
| Parts Toluene | — | 1.0 | — | 1.0 |
| Foam Appearance | Fair Foam, Uneven Cell Structure, Part Collapsed | Better than Exp. 3, Uneven Cell Structure, Partially Collapsed | Good Foam, Elastic Fairly Even Cell Structure, Tough | Very Good, Foam, Elastic Tough, Good Even Cell Structure |

In all cases the ingredients were combined by mixing with a spatula in a small metal cup to obtain a homogeneous mass.

The use of this solution in a pressurized aerosol can permit the instant production of a rigid or flexible foam by issuance of the polymer which will foam as soon as it reaches atmospheric pressure. The use of the proper volatile polar compound permits the reforming of ionic domains during the foaming process and this effectively cures the foam. Thus, 1 part of sulfonated polystyrene, containing 0.2 to 20 mole percent pendant sulfonate groups, at least 90 percent of which are neutralized with neutralizing agents discussed above, 3–4 parts of difluorodichlormethane plus a small amount (.02 to 0.2 parts) of ammonia or methyl amine are contained in a pressurized aerosol can. Upon release of the pressure and "instant" foam is formed. Such instant form systems are highly desired in the insulation and construction industry.

EXAMPLE 9

A copolymer of poly t-butylstyrene with isoprene (about 7.0 wt. percent isoprene) was sulfonated and neutralized to obtain the predominately poly t-butylstyrene copolymer containing about 2.4 weight percent sodium sulfonate groups. The sulfonate polymer was finally divided by pulverizing with a high shear blender, and then screened through a 100 mesh screen. The particle diameter was estimated at 150 microns. A blend of 0.5 parts of this sulfonated polymer and 1.0 parts of an oil based on paraffinic and naphthenic hydrocarbons having an average molecular weight of about 500 was prepared. To this blend (a liquid suspension) about .01 parts of isopropanol was added, and the resultant mixture was stirred until homogeneous.

This product was placed into an open mold and heated rapidly to a temperature in excess of 100°C. A foamed product was created which showed no tendency to shrink even when held at elevated temperature in excess of 200°C. The product, when cooled, was flexible, tough, and appeared to possess a good uniform cell structure. The foam density was estimated to be about 25 lbs. per cubic foot. In this experiment, we have shown that isopropanol can be simultaneously employed as the blowing agent and the volatile polar compound.

What is claimed is:

1. A process for making a foamed polymeric product which comprises foaming a mixture comprising an ionic polymer, said ionic thermoplastic polymer comprising from about 0.2 to 20 mole percent pendant acid groups, said pendant acid groups being selected from the group consisting of carboxylic, sulfonic, and phosphonic fgroups, and said acid groups being neutralized to a degree of at least 90 percent, to form an ionic polymer and a volatile polar compound which is a preferential plasticizer for said ionic polymer said volatile polar compound being present in said mixture at from about 0.1 to 50 moles per mole of ionic groups.

2. A process for making a foamed polymeric product, which comprises mixing an ionic thermoplastic polymer, said ionic polymer comprising from about 0.2 to 20 mole percent pendant acid groups, said pendant acid groups being selected from the group consisting of carboxylic, sulfonic, and phosphonic groups, and said acid groups being neutralized to a degree of at least 90 percent to form an ionic polymer, a foaming agent, and a volatile polar compound, said volatile polar compound being in an amount of from about 0.1 to moment of at least 50 moles per mole of ionic groups, and said volatile polar compound having a dipole moment of at least 0.9 debyes and a boiling point of less than 200°C, and being characterized as being a preferential plasticizer for said pendant ionic groups, heating to a temperature sufficient to convert said foaming agent to a gaseous form and cooling to recover the foamed polymeric product.

3. The process of claim 2 wherein said pendant ionic thermoplastic groups are selected from the group consisting of sulfonate and carboxylate groups.

4. The process of claim 3 wherein said ionic groups are neutralized by compounds selected from the group consisting of (1) ammonia, (2) $C_1$ to $C_{30}$ amines, (3) basic compounds selected from Groups I and II of the Periodic Table of the Elements, and (4) basic compounds selected from the group consisting of lead, tin and antimony, and (5) mixtures thereof.

5. The process of claim 4 wherein said polar compound boils from about 100°C. below to about 50°C. higher than the temperature at which the foaming process takes place.

6. The process of claim 4 wherein said polar compound boils from about 50°C. below to about 25°C. higher than the temperature at which the foaming process takes place.

7. The process of claim 4 wherein the molar ratio of volatile polar compound to the pendant ionic groups is from about 0.1 to about 50.

8. The process of claim 4 wherein said ionic polymer comprises from about 20 to 99 wt. percent of said mixture.

9. The process of claim 8 wherein said foaming agent comprises from about 1 to 300 wt. percent of said ionic polymer.

10. The process of claim 9 wherein the molar ratio of said volatile polar compound to said pendant ionic groups is from about 0.2 to about 20.

11. The process of claim 4 wherein said pendant ionic groups are sulfonate groups.

12. The process of claim 4 wherein said ionic polymer is a sulfonated plastic.

13. The process of claim 4 wherein said ionic polymer is a sulfonated elastomer.

14. The process of claim 4 wherein said ionic polymer is a sulfonated polystyrene.

15. The process of claim 4 wherein said ionic polymer is a sulfonated copolymer selected from the group consisting of isobutylene/isoprene copolymers, ethylene/propylene/5-ethylidene-2-norbornene terpolymers and butadiene polymers.

16. The process of claim 4 wherein said foaming agent is selected from the group consisting of sodium bicarbonate, sodium bicarbonate and citric acid, azobisformamide, azobisisobutyronitrile, diazoaminobenzene, toluene-4-sulfonyl hydrazide, N,N'-dinitrosopentamethylene-tetramine, pentane, hexane, heptane, benzene, toluene, methylene chloride, trichloroethane, 1,2-dichloroethane, carbon dioxide, ammonia, dichlorodifluoromethane, sulfur dioxide and nitrogen.

17. The process of claim 4 wherein said volatile polar compound is selected from the group consisting of $C_1$ to $C_{20}$ alcohols, $C_1$ to $C_{20}$ amines, $C_1$ to $C_{20}$ thiols, water and ammonia.

18. The process of claim 4 wherein said neutralizing agent is selected from the group consisting of the hydroxides, oxides, carboxylates and $C_1$ to $C_{20}$ alkoxides of barium, calcium, magnesium, potassium and sodium.

19. The process of claim 18 wherein said neutralizing agent is NaOH.

20. The process of claim 19 wherein said volatile polar compound is methanol and said foaming agent is selected from the group consisting of benzene and toluene.

21. The process of claim 20 wherein said mixture comprises a nucleating agent.

22. A process for making a foamed polymeric product which comprises heating a mixture containing an ionic polymer, said ionic polymer comprising from about 0.2 to about 20 mole percent pendant ionic groups, a non-volatile liquid chain plasticizer, a foaming agent, and a volatile polar compound to a temperature at which foaming occurs, said polar compound being characterized as a plasticizer for said pendant ionic groups, which boils at a temperature which is within 50°C. of said foaming temperature.

23. The process of claim 22 wherein said ionic polymer is a sulfonated polystyrene, and said chain plasticizer is selected from the group consisting of di-n-hexyl adipate, dicapryl adipate, di-(2-ethyl hexyl) adipate, dibutoxy-ethyl adipate, benzyloctyl adipate, tricyclohexyl citrate, butyl phthalyl butyl glycolate, butyl laurate, n-propyl oleate, n-butyl palmitate, dibutyl phthalate, dihexylphthalate, dioctylphthalate, tributyl phosphate, dioctyl sebacate and mixtures thereof.

24. The process of claim 23 wherein said chain plasticizer is dioctyl phthalate.

25. The process of claim 24 wherein said volatile polymer compound is methanol, said foaming agent is selected from the group consisting of benzene and toluene.

26. The process of claim 22 wherein said ionic polymer is a sulfonated copolymer of t-butyl styrene and isoprene and said chain plasticizer is a hydrocarbon oil.

27. The process of claim 26 wherein said neutralizing agent is NaOH.

28. The process of claim 27 wherein said volatile polar compound and said foaming agent is isopropanol.

* * * * *